(12) United States Patent
    Crondahl et al.

(10) Patent No.: US 10,006,712 B2
(45) Date of Patent: Jun. 26, 2018

(54) RECIRCULATING SYSTEM FOR USE WITH GREEN WOOD VENEER DRYERS AND METHOD FOR DRYING GREEN WOOD VENEER

(71) Applicant: Westmill Industries Ltd., Aldergrove (CA)

(72) Inventors: Michael Crondahl, Mission (CA); Burnell Wimer, Boise, ID (US)

(73) Assignee: Westmill Industries Ltd., Aldergrove (CA)

( * ) Notice: Subject to any disclaimer, the term of this patent is extended or adjusted under 35 U.S.C. 154(b) by 783 days.

(21) Appl. No.: 14/507,689

(22) Filed: Oct. 6, 2014

(65) Prior Publication Data
    US 2016/0097592 A1    Apr. 7, 2016

(51) Int. Cl.
    F26B 5/04     (2006.01)
    F26B 21/02    (2006.01)
    F26B 23/00    (2006.01)
    F26B 23/02    (2006.01)
    F26B 25/00    (2006.01)

(52) U.S. Cl.
    CPC ............ *F26B 21/02* (2013.01); *F26B 23/002* (2013.01); *F26B 23/024* (2013.01); *F26B 25/008* (2013.01); *F26B 2210/14* (2013.01); *Y02P 70/405* (2015.11)

(58) Field of Classification Search
    CPC ...... F26B 21/02; F26B 25/008; F26B 23/002; F26B 2210/14; Y02P 70/40; Y02P 70/405
    USPC .... 34/396, 417, 486, 514, 86, 218, 219, 242
    See application file for complete search history.

(56) References Cited

U.S. PATENT DOCUMENTS

| | | |
|---|---|---|
| 3,548,513 A | 12/1970 | Taylor |
| 3,882,612 A | 5/1975 | Try et al. |
| 4,017,254 A | 4/1977 | Jones |
| 4,026,037 A | 5/1977 | Buchholz |
| 4,121,350 A | 10/1978 | Buchholz |
| 4,127,946 A | 12/1978 | Buchholz |
| 4,215,489 A | 8/1980 | McMahon, Jr. |
| 4,439,930 A | 4/1984 | McMahon, Jr. |
| 5,513,743 A | 5/1996 | Brink |
| 5,603,168 A | 2/1997 | McMahon, Jr. |
| 8,046,932 B2 | 11/2011 | Wolowiecki |
| 8,196,310 B2 | 6/2012 | McMahon et al. |

(Continued)

FOREIGN PATENT DOCUMENTS

| | | |
|---|---|---|
| EP | 0609938 B1 | 5/1999 |
| EP | 1187780 B2 | 9/2005 |

*Primary Examiner* — John McCormack
(74) *Attorney, Agent, or Firm* — Stephanie A. Melnychuk; George F. Kondor; Oyen Wiggs Green & Mutala LLP

(57) ABSTRACT

A recirculating system for use with a green wood veneer dryer is provided. The recirculating system includes a duct connecting an input end seal chamber at an input end of a drying chamber to at least one fan disposed within the drying chamber. The at least one fan generates a negative pressure differential within the duct to redirect gases from the input end seal chamber to the drying chamber to maintain the pressure within the input end seal chamber within an accurate range of pressure external the veneer dryer. A method of drying green wood veneer is provided including recirculating gases from the input end seal chamber to the drying chamber and maintaining the pressure within the input end seal chamber within an accurate range of the pressure external the dryer.

17 Claims, 4 Drawing Sheets

(56) References Cited

U.S. PATENT DOCUMENTS

| | | |
|---|---|---|
| 8,381,414 B2 | 2/2013 | Wolowiecki |
| 2008/0104859 A1 | 5/2008 | Wolowiecki |

RECIRCULATING SYSTEM FOR USE WITH GREEN WOOD VENEER DRYERS AND METHOD FOR DRYING GREEN WOOD VENEER

TECHNICAL FIELD

The present invention relates generally to apparatus and methods for drying sheet materials, and especially green wood veneer.

BACKGROUND OF THE INVENTION

Single and multiple deck conveyor dryers for reducing the moisture content of sheet materials, including green wood veneer, wherein the material being dried is conveyed through a stationary drying chamber while heated gases are circulated through the drying chamber, are well-known in the art. Evaporation of moisture from the material being dried causes an increase in the volume of gases in the dryer. Disposal of large amounts of gases containing volatile organic carbon (V.O.C.) which are evolved from the veneer during drying has been a major problem in the veneer drying art. Typically, gases are removed by an exhaust system and, in some systems, are exhausted directly to the atmosphere. By allowing gases to be exhausted directly to the atmosphere, pollutants have been allowed to escape and considerable quantities of heat energy are lost which is a considerable cost expense.

It is desirable to control the exhaust of gases from a wood veneer dryer to optimize the drying efficiency of the dryer and to provide a means for containing and treating the exhaust gases prior to discharge into the atmosphere. Such means include installing a V.O.C. separating device such as a catalytic or thermal oxidizer in the exhaust system. Such devices are well-known in the art. In order to optimize performance of these devices, it is preferable to maintain the temperature of the exhaust gases at or above a minimum operating temperature. At temperatures below this minimum operating temperature, pitch (i.e., condensed V.O.C. material) builds-up in the exhaust system, representing an obvious fire hazard. A fire in the exhaust system would result in costly repairs. While attempts have been made to optimize the performance of such exhaust systems, maintaining the temperature of the exhaust gases at or above the minimum operating temperature has proved difficult.

If the drying process is not carefully controlled and optimized, gases within a dryer of this type will be discharged through not only the exhaust system, but through input and output ends of the dryer because a positive pressure differential is created within the dryer relative to the external atmosphere. These prior art dryers have other disadvantages, including a loss of efficiency due to the entrance of air at ambient temperature into the dryer through input and output ends if a negative pressure differential is created within the dryer relative to the external atmosphere if gases are exhausted too quickly. Entrance of cooler ambient air reduces the temperature of the dryer, resulting in pitch-build up within the dryer and a real fire hazard.

There is accordingly a need in the art for a green wood veneer dryer wherein the temperature and pressure within the dryer are controlled to optimize performance of the dryer, prevent the build-up of pitch within the dryer and exhaust system, and prevent the outflow of gases containing V.O.C. from the dryer before treatment in the exhaust system.

The foregoing examples of the related art and limitations related thereto are intended to be illustrative and not exclusive. Other limitations of the related art will become apparent to those of skill in the art upon a reading of the specification and a study of the drawings.

SUMMARY OF THE INVENTION

The following embodiments and aspects thereof are described and illustrated in conjunction with systems, tools and methods which are meant to be exemplary and illustrative, not limiting in scope. In various embodiments, one or more of the above-described problems have been reduced or eliminated, while other embodiments are directed to other improvements.

In order to address the foregoing, the invention provides a recirculating system for recirculating gases from an input end seal chamber of a green veneer dryer to a drying chamber to maintain the pressure within the input end seal chamber within an accurate range of the pressure external the dryer. Thus, gases containing V.O.C. are substantially prevented from escaping the dryer and ambient air is substantially prevented from entering the dryer An aspect of the invention provides a recirculating system for use with a green wood veneer dryer including an elongated drying chamber having an input end and an output end and an input end seal chamber connected to the input end of the drying chamber for receiving an outflow of gases from the drying chamber. At least one fan is disposed within the drying chamber for circulating heated gases within the drying chamber. The recirculating system includes a duct connecting the input end seal chamber to the at least one fan. The at least one fan generates a negative pressure differential within the duct to redirect the gases from the input end seal chamber to the drying chamber to maintain the pressure within the input end seal chamber within an accurate range of pressure external the dryer.

In an embodiment of the present invention, the recirculating system includes an airflow controller connected to the duct for adjusting the rate at which the gases recirculate from the input end seal chamber to the drying chamber.

In an embodiment of the present invention, the recirculating system includes pressure sensors for operating the airflow controller. In some embodiments, the pressure sensors detect a pressure differential within the input end seal chamber and the drying chamber relative to the pressure external the dryer. In other embodiments, the pressure sensors further detect a pressure differential within an exhaust system.

Another aspect of the present invention provides a method of drying green wood veneer. The method includes conveying green wood veneer from an input end to an output end of a green wood veneer dryer, circulating heated gases within a drying chamber of the dryer, recirculating the gases received by an input end seal chamber connected to an input end of the drying chamber to the drying chamber, and maintaining the pressure within the input end seal chamber within an accurate range of the pressure external the dryer.

In an embodiment of the present invention, the method includes sensing the pressure within the input end seal chamber, the drying chamber, and an exhaust system relative to the pressure external the dryer.

In addition to the exemplary aspects and embodiments described above, further aspects and embodiments will become apparent by reference to the drawings and by study of the following detailed descriptions.

BRIEF DESCRIPTION OF DRAWINGS

Exemplary embodiments are illustrated in referenced figures of the drawings. It is intended that the embodiments and figures disclosed are to be considered illustrative of the invention rather than restrictive.

Figure 1:
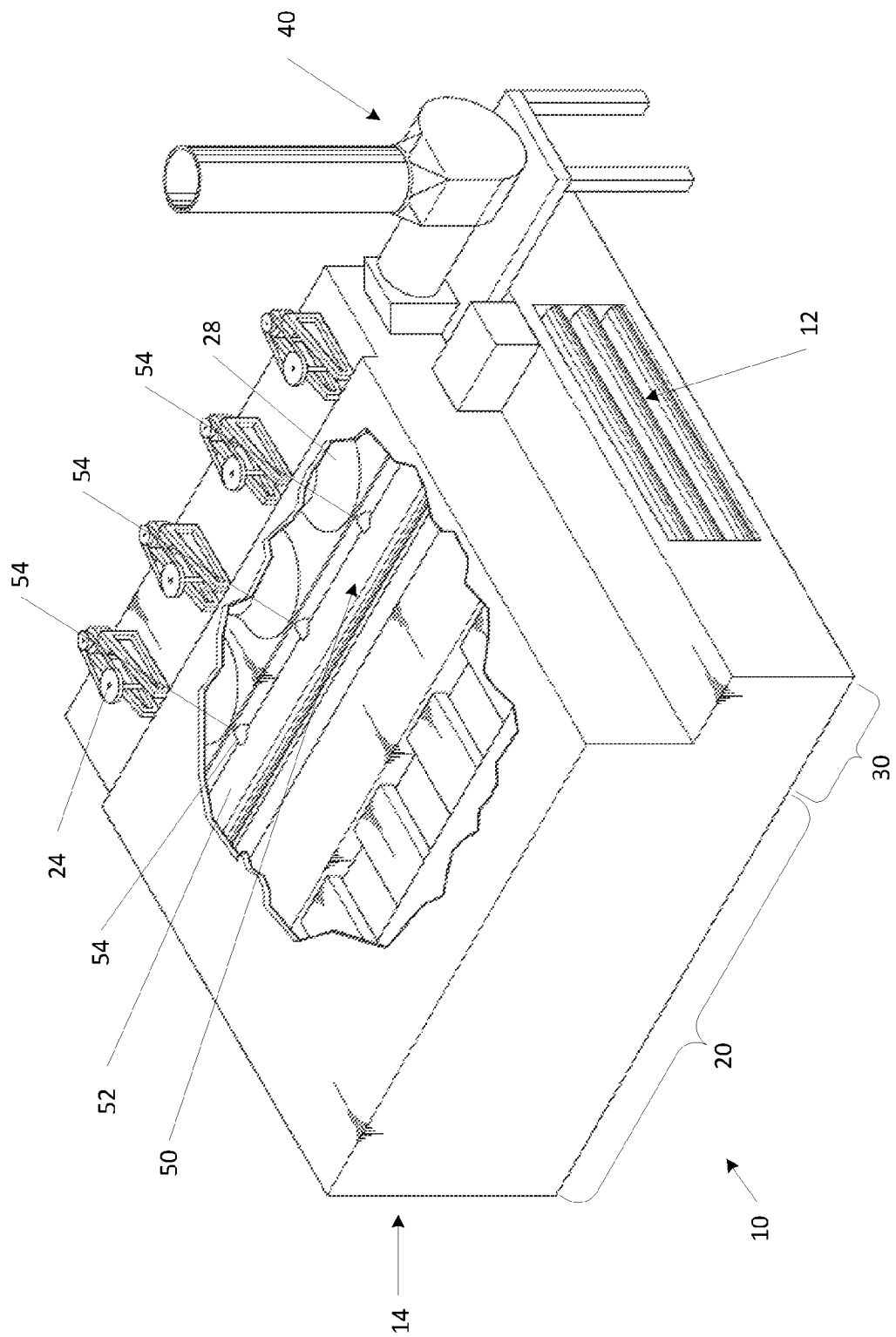
FIG. 1 is a fragmented isometric view of a recirculating system used with a green wood veneer dryer according to an embodiment of the present invention.

LIST OF REFERENCE CHARACTERS AND THEIR CORRESPONDING PARTS 10 wood veneer dryer
12 input end (of the dryer)
14 output end (of the dryer)
16 at least one conveyor
20 elongated drying chamber
24 at least one fan motor
26 at least one fan
28 at least one inlet cone
30 input end seal chamber
32 pinch roll assemblies
34 baffles
36 collecting region
37 separator
38 aperture
39 conveying region
40 exhaust system
50 recirculating system
52 duct
54 at least one connector
60 airflow controller
70 pressure sensors
80 heat source
90 intermediary chamber
92 cooling chamber
A gas air flow path within dryer 10
B gas air flow path within dryer 10

DETAILED DESCRIPTION

In this specification, the term "input end" in relation to the green wood veneer dryer and components thereof means the end wherein green wood veneer to be dried is introduced into the dryer, drying chamber, or cooling chamber. The term "output end" in relation to the green wood veneer dryer and components thereof means the end opposite to the input end, i.e. the end wherefrom dried wood veneer exits the dryer, drying chamber, or cooling chamber. The term "direction of travel" means the direction in which green wood veneer to be dried travels from the input end to the output end of the green wood veneer dryer, i.e. the direction from left to right in the view of FIG. 2.

The term "positive pressure differential" means the pressure within the green wood veneer dryer, or components thereof, that is greater than the pressure external the dryer. The term "negative pressure differential" means the pressure within the green wood veneer dryer, or components thereof, that is less than the pressure external the dryer. The term "zero pressure differential" means the pressure within the input end seal chamber, or components thereof, is within an accurate range of the pressure external the dryer. The term "inlet end" in relation to the recirculating system and components thereof means the end wherein gases are introduced into the component. The term "outlet end" in relation to the recirculating system and components thereof means the end opposite to the inlet end, i.e. the end wherefrom gases exit the component.

Figure 2:
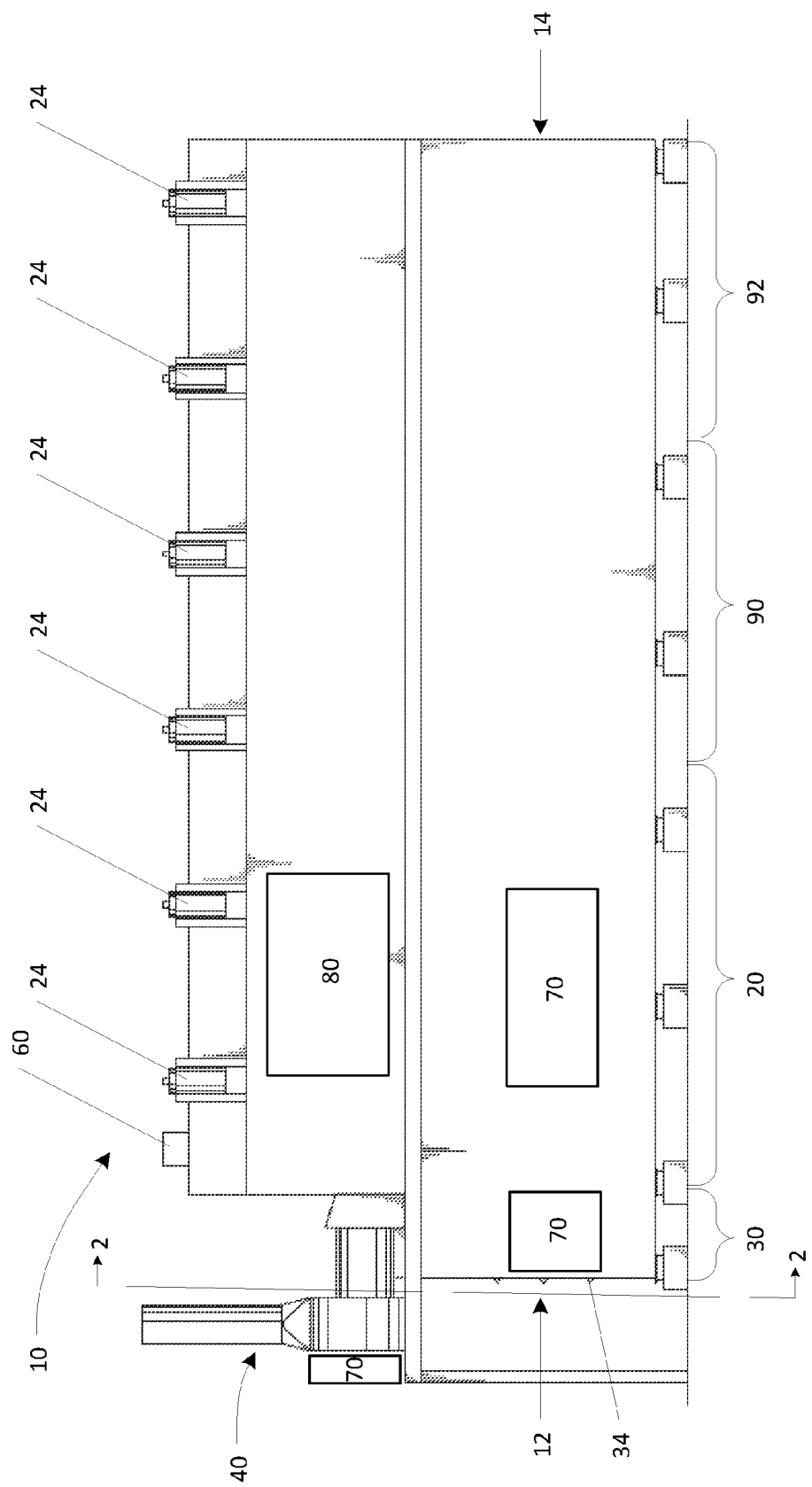
FIG. 2 is a side elevation view of the recirculating system used with the green wood veneer dryer of the embodiment shown in FIG. 1.

Referring to FIG. 1, a green wood veneer dryer 10 comprises a single or multiple juxtaposed elongated drying chambers 20 and an input end seal chamber 30 connected to an input end 12 of the drying chamber. A typical dryer has several juxtaposed drying chambers 20. Dryer 10 may further comprise a single or multiple cooling chambers 92 juxtaposed to the output end of the single or multiple drying chambers 20 for cooling dried wood veneer before it exits an output end 14 of the dryer. Green wood veneer to be dried is introduced at input end 12 of input end seal chamber 30 and travels along at least one conveyor 16 longitudinally extending from the input end to output end 14 of drying chamber 20 (FIG. 2). Input end seal chamber 30 comprises a plurality of vertically-spaced and transversely aligned pinch roll assembles 32 that define a path of movement for the green wood veneer to travel to be dried, as best seen in FIG. 2. Alternatively, the green wood veneer is conveyed through dryer 10 by a single or multiple deck conveyors.

A baffle 34 is disposed between each pinch roll assembly 32 at the input end 12 of input end seal chamber 30 to prevent the flow of ambient air into the input end 12 of dryer 10. Each baffle 34 seals the air gap between the vertically-spaced pinch roll assemblies 32. The air seal created between vertically-spaced pinch roll assemblies 32 allows for each pinch roll assembly to move relative to baffle 34 as green wood veneer approaches the nip of the pinch roll assembly and enters input end seal chamber 30.

Drying chamber 20 comprises at least one fan motor 24 for driving at least one corresponding fan 26 which circulates air within the drying chamber 20 in a circular path, substantially transverse to the direction of travel of the green wood veneer to be dried. The air may be heated by a heat source 80, such as a gas-fired burner, a steam coil, a thermal oil system, a waste-fired burner, or an electric heater.

A "jet-type" green wood veneer dryer of the sort shown in FIG. 1 is well-known in the art and includes heat source 80 and a blower for each drying chamber 20, and with means provided, such as jet wood veneer dryer nozzles, for directing heated air at localized points towards opposite faces of the green wood veneer traveling through drying chamber 20. The air then flows into at least one inlet cone 28 connected to the corresponding fan 26.

As the green wood veneer to be dried is heated, moisture is released from the wood veneer and the volume of gases within drying chamber 20 increases resulting in a positive pressure differential within the green wood veneer dryer relative to the external atmosphere. Excess gases may be exhausted through an exhaust system 40 (FIG. 1), such as a single point exhaust system known in the art. According to the embodiment shown in FIG. 1, all exhausting is done at the input end 12 of dryer 10 where the temperature of the gases is high relative to the output end 14 of drying chamber 20. The amount of gases exhausted through exhaust system 40 is carefully controlled using pressure sensors 70 to maintain a desired pressure differential within the dryer.

Input end seal chamber 30 is connected to receive an outflow of gases from drying chamber 20 as the pressure differential within drying chamber 20 becomes positive. A collecting region 36 defines an upper region of input end seal chamber 30 and is separated from a lower conveying region 39 by a separator 37. Gases enter collecting region 36 via an aperture 38 located in separator 37. Aperture 38 may be positioned in the centre of separator 37, or may be offset therefrom. Alternatively, separator 37 may be perforated. Conveying region 39 comprises pinch roll assemblies 32 and baffles 34 that define the path of movement for the green wood veneer to travel as it enters input end seal chamber 30.

Input end seal chamber 30 is provided with a recirculating system 50 for recirculating the gases from collecting region 36 to drying chamber 20. In other embodiments, recirculating system 50 is directly connected to input end seal chamber 30 and no collecting region is provided. FIG. 2 illustrates the components of recirculating system 50. Recirculating system 50 comprises a duct 52 connected to input end seal chamber 30. Duct 52 longitudinally extends from collecting region 36 through drying chamber 20 towards the output end. Duct 52 is connected below at least one inlet cone 28 via a corresponding connector 54. Inlet cone 28 and corresponding connector 54 provide a flow path to corresponding fan 26. Recirculating system 50 further comprises an airflow controller 60 for adjusting the rate of recirculation as a function of the pressure differential sensed using pressure sensors 70 located within drying chamber 20, input end seal system 30, and external to dryer 10. In some embodiments, airflow controller 60 is a damper connected to an input end of duct 52 for regulating the flow of gases through recirculating system 50. In other embodiments, airflow controller 60 comprises a plurality of dampers 62 each provided at an inlet end adjacent to each connector 54, as best seen in FIG. 1.

The airflow controller, manually or through the use of pressure sensors 70, maintains a zero pressure differential within input end seal chamber 30. At zero pressure differential, the gases within input end seal chamber 30 are substantially prevented from discharging through the input end 12 of the dryer and the gases external the dryer are substantially prevented from entering input end seal chamber 30.

Figure 3:
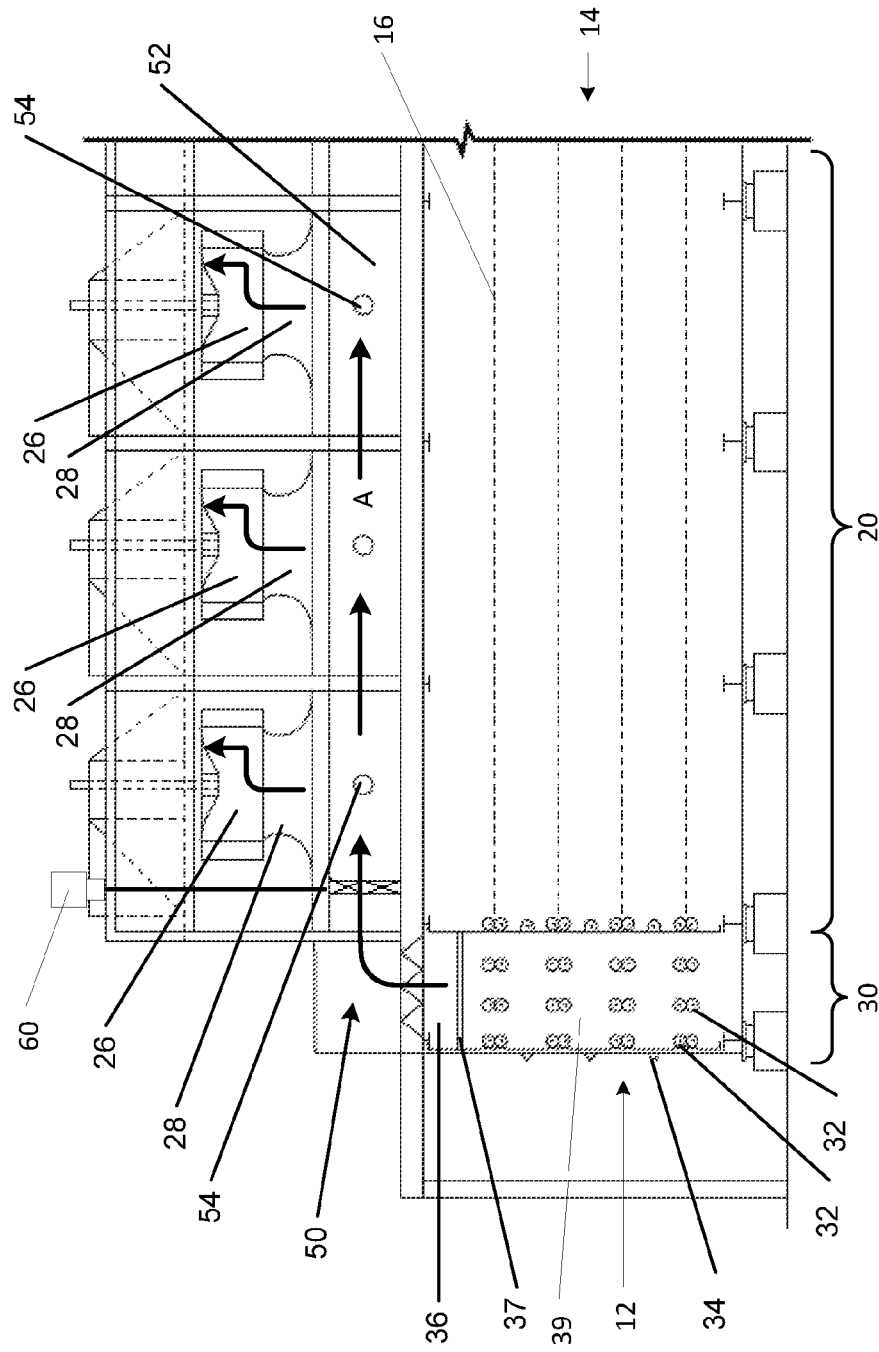
FIG. 3 is a fragmented side elevation cross-sectional view of the recirculating system used with the green wood veneer dryer of the embodiment shown in FIG. 2 taken along the lines 2-2.
Figure 4:
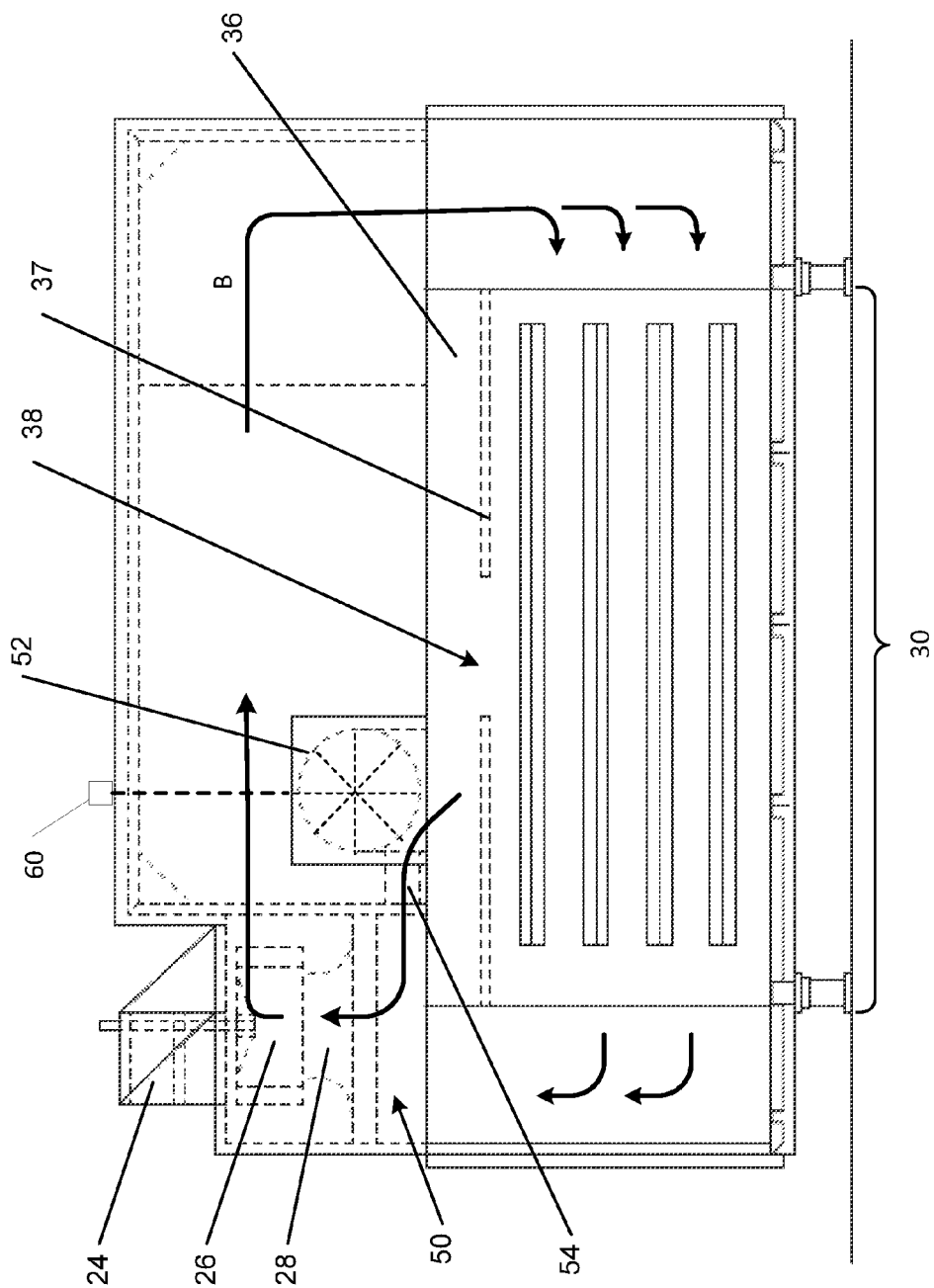
FIG. 4 is a front elevation view of the recirculating system used with the green wood veneer dryer of the embodiment shown in FIG. 1.

When at least one fan 26 is in operation, a negative pressure differential is produced at corresponding inlet cone 26. The negative pressure differential acts to establish a flow of air in a circular path, substantially transverse to the direction of travel of the green wood veneer through drying chamber 20 and to establish a flow path of air from input end seal chamber 30, through recirculating system 50 (represented by gas flow path arrows B in FIG. 4). As best seen in FIG. 3, arrows A indicate the gas flow path from collecting region 36 through recirculating system 50 to fan 26.

As excess pressure is generated in drying chamber 20, the gases are forced into input end seal chamber 30. This increases the pressure of the gases in input end seal chamber 30. Alternatively, when excess gases are not generated in drying chamber 20, or is being overly exhausted by exhaust system 40, the pressure differential in input end seal chamber 30 may become negative. By maintaining a fixed zero pressure differential, maximum drying efficiency and minimal pollutant exhausting to the atmosphere can be maintained. Pressure sensors 70 may be used to indicate the pressure differential between the pressure in input end seal chamber 30, drying chamber 20, exhaust system 40, and/or the external atmosphere. By controlling airflow controller 60, adjusting the rate of exhaust flow, and adjusting the speed of at least one fan 26, or a combination thereof, zero pressure differential can be maintained within input end seal chamber 30.

In the embodiments of FIGS. 1 to 3, recirculating system 50 provides a fluid connection from input end seal chamber 30 to at least one fan 26 inside drying chamber 20. In other embodiments, the recirculating system may be in fluid connection with the input end of a juxtaposed intermediary chamber such as a drying chamber, a cooling chamber, or a chamber having an ambient environment. As excess pressure is generated in drying chamber 20, the gases may be forced into intermediary chamber 90 due to a positive pressure differential within the drying chamber relative to intermediary chamber 90. For example, the gases within a cooling chamber are often exhausted directly to the atmosphere without treating the gases to remove V.O.C. materials. This represents an obvious environmental hazard. Further, at the lower temperatures within a cooling chamber or intermediary chamber at ambient temperature, the V.O.C. materials condense and pitch builds-up representing an obvious fire hazard.

Recirculating system 50 provides a means for recirculating the gases from intermediary chamber 90 to drying chamber 20. Recirculating system 50 may comprise duct 52 connected to the input end of intermediary chamber 90. Duct 52 longitudinally extends from the input end of intermediary chamber 90 through drying chamber 20 towards the input end. The duct 52 may be connected to the input end seal chamber. Duct 52 is connected below at least one inlet cone 28 via the corresponding connector 54. Inlet cone 28 and corresponding connector 54 provide a flow path to corresponding fan 26. Recirculating system 50 may comprise an airflow controller 60 for adjusting the rate of recirculation as a function of the pressure differential sensed using pressure sensors 70 located within drying chamber 20, intermediary chamber 90, and external to dryer 10.

Throughout the following description specific details are set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense.

While a number of exemplary aspects and embodiments have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as are within their true spirit and scope.

We claim:

1. A method of drying green wood veneer, the method comprising:
    conveying green wood veneer from an input end to an output end of a green wood veneer dryer;
    circulating heated gases within a drying chamber of the green wood veneer dryer;
    recirculating the gases received by an input end seal chamber connected to an input end of the drying chamber to the drying chamber; and
    maintaining a zero pressure differential between the pressure inside the input end seal chamber and the pressure external the green wood veneer dryer.

2. A method according to claim 1, further comprising sensing the pressure within the input end seal chamber and the drying chamber relative to the pressure external the green wood veneer dryer.

3. A method according to claim 2, further comprising sensing the pressure within an exhaust system.

4. A method according to claim 1, further comprising recirculating the gases received by an intermediary chamber connected to an output end of the drying chamber to the drying chamber.

5. A method according to claim 4, further comprising maintaining a zero pressure differential between the pressure inside the intermediary chamber and the pressure external the green wood veneer dryer.

6. A recirculating system for use with a green wood veneer dryer comprising a drying chamber including an input end and an output end, an input end seal chamber connected to the input end of the drying chamber for receiving an outflow of gases from the drying chamber, and at least one fan disposed within the drying chamber for circulating gases within the drying chamber, the recirculating system comprising a duct connecting the input end seal chamber to the at least one fan, wherein the at least one fan generates a negative pressure differential within the duct to redirect the gases from the input end seal chamber to the drying chamber to maintain a zero pressure differential between the pressure inside the input end seal chamber and the pressure external the green wood veneer dryer.

7. A recirculating system according to claim 6, further comprising an airflow controller connected to the duct for adjusting the rate at which the gases recirculate from the input end seal chamber to the drying chamber.

8. A recirculating system according to claim 7, further comprising pressure sensors for operating the airflow controller.

9. A recirculating system according to claim 8, wherein the pressure sensors detect a pressure differential within the input end seal chamber and the drying chamber relative to the pressure external the green wood veneer dryer.

10. A recirculating system according to claim 9, wherein the pressure sensors further detect a pressure differential within an exhaust system.

11. A recirculating system according to claim 7, wherein the airflow controller is controlled manually.

12. A recirculating system according to claim 7, wherein the airflow controller comprises a damper.

13. A recirculating system according to claim 7, wherein the airflow controller is connected to the duct proximate to the input end seal chamber.

14. A recirculating system according to claim 12, wherein the airflow controller comprises at least one damper, each damper connected to the duct by at least one connector.

15. A recirculating system according to 6, further comprising a collecting region connecting the duct to the input end seal chamber for receiving gases from the input end seal chamber and a separator disposed between the collecting region and the input end seal chamber, the separator comprising at least one aperture.

16. A recirculating system according to claim 15, wherein the separator is perforated.

17. A recirculating system according to claim 6, wherein the duct further connects an intermediary chamber connected to the output end of the drying chamber to the at least one fan so that the negative pressure differential generated by the at least one fan redirects gases from the intermediary chamber to the drying chamber to maintain a zero pressure differential between the pressure inside the intermediary chamber and the pressure external the green wood veneer dryer.

* * * * *